May 18, 1954     K. N. FROMM     2,679,011

RADIATION DETECTOR SYSTEM

Filed June 14, 1950

WITNESSES:
*Robert A Baird*
*Marvin W. Dodd*

INVENTOR
Kenneth N. Fromm.
BY *J. E. Browder*
ATTORNEY

Patented May 18, 1954

2,679,011

UNITED STATES PATENT OFFICE 2,679,011

RADIATION DETECTOR SYSTEM

Kenneth N. Fromm, Pittsburgh, Pa., assignor, by mesne assignments, to the United States of America as represented by the Secretary of the Navy Application June 14, 1950, Serial No. 168,051

3 Claims. (Cl. 250—83.6)

My invention relates to radiation detection, and more particularly to a circuit for controlling the operation of an ionization chamber.

In accordance with the prior art of which I am aware, radiation detectors have been built employing gas filled counter tubes of the Geiger type. These detectors are generally divided into three types according to the potential applied to the counter tubes.

When the counter tube is operated at a relatively high potential thereby causing the tube to operate in that part of the characteristic curve of pulse size versus voltage in which the pulse size is independent of the number of ions produced in the initial ionizing event the counter is said to be operated in the Geiger region and the apparatus comprising the counter tube is, therefore, called a Geiger counter.

When the counter tube is operated at a lower potential than that corresponding to the Geiger region, thereby causing the tube to operate in that part of the characteristic curve of pulse size versus voltage in which the pulse size is substantially proportional to the number of ions formed in the initial ionizing event, but in which there is still substantial amplification, the tube is said to be operated in the proportional region and the apparatus comprising the counter tube is, therefore, called a proportional counter.

If the potential on the counter tube is made smaller than that corresponding to the Geiger region, so that substantially no gas amplification occurs, the counter tube is said to operate as an ionization chamber.

Counters operated in the Geiger region have the advantage that when a quantum of radiation enters the counter tube, the gas inside the counter tube breaks down disruptively, thereby producing a large current pulse. However, the amplitude of the current pulse is the same whether the radiation entering the chamber is a high energy quantum such as a gamma ray which produces a relatively large number of initial ionizations, or whether it is a low energy quantum such as an X-ray which produces a relatively small number of initial ionizations.

While counters operated in the proportional region produce an output pulse which is to some extent proportional to the number of ions produced in the initial ionizing event this relationship is only an approximation. The proportional counter also has the disadvantage of a small output pulse, therefore requiring a highly sensitive amplifier.

The ionization chamber has, therefore, been employed for many purposes because the pulse output therefrom is directly proportional to the number of ions produced in the initial ionizing event.

Ionization chambers may be divided generally into two classes differing primarily in the value of resistance through which the charge from the collecting electrode leaks off. In the first type, the collector resistance is relatively small so that the pulses due to individual particles are easily detected. The chamber then counts individual particles or quanta and the output pulse size is very closely proportional to the amount of ionization produced by each ionizing event. In the second type, using much higher collector resistance, the pulses are allowed to add up and the integrated total of the ionization produced in a given time is measured as a direct current.

These two types of counters serve different purposes and each has advantages in particular applications which are not found in the other. In using the device as a pulse counter, it is possible by employing comparatively complicated circuits to measure total ionization by using both pulse repetition and difference in pulse height. Such a scheme would be both complicated and would produce results inferior to those obtained with a chamber operated as an integrating device.

Operation of the counter at higher voltages produces large gas amplification but all information as to ionization per pulse is lost since all pulses have the same amplitude.

It is, accordingly, an object of my invention to provide apparatus for the detection of small intensities of radiation, the output of which will give an indication of the intensity of the radiation impinging on the detector, and which apparatus does not require the use of highly sensitive amplifiers.

Another object of my invention is to provide radiation detection apparatus which produces a series of pulses, the frequency of which, as distinguished from the amplitude, is a function of the intensity of radiation incident thereon.

An ancillary object of my invention is to provide radiation detection apparatus comprising an ionization chamber wherein the charge carried to one of the electrodes by the ions produced therein will be stored until a charge of predetermined magnitude is collected.

Another ancillary object of my invention is to provide radiation detection apparatus wherein the charge collected on an electrode thereof will be quickly dissipated when the charge thereon reaches a predetermined level.

In accordance with my invention, I provide a gas filled counter tube comprising a center conductor surrounded by a wall of conducting material. A source of D. C. potential is connected between the center conductor and the wall of the counter tube through a very large resistance. When radiation enters the counter tube and causes ions to be deposited on the center conductor, the charge thereby established on the center conductor requires a substantial length of time to leak off.

The time required for the charge to be dissipated is a function of the resistance and capacitance between the center electrode and ground. If this time required for dissipation is large enough, the charge will build up on the center conductor over a substantial period of time without a substantial proportion of that charge being dissipated by conduction to ground. When this charge has built up to a predetermined magnitude over a period of time, it is desirable that that charge be quickly neutralized, producing an output pulse, so that the apparatus will be again ready to measure incident radiation. The repetition frequency of the output pulse is then proportioned to the interpreted ionization. I have, therefore, provided apparatus comprising a vacuum tube, which vacuum tube will conduct when the charge on the center electrode of the counter tube reaches a predetermined magnitude. This tube is incorporated in apparatus which will cause the current through the tube, once it starts, to continue to build up to a large magnitude quickly, and then return to zero, while drawing a substantial grid current in the interim. This grid current neutralizes the charge on the center electrode of the counter tube and prepares that tube for the detection of more radiation.

Several types of apparatus may be employed which will be responsive to the magnitude of the charge on the counter tube, and which will cause the sudden neutralization of that charge, among which is a blocking oscillator as I have shown in Fig. 1, or a triggered multivibrator as shown in Fig. 2.

The novel features which I consider characteristic of my invention are set forth with more particularity in the appended claims. The invention, however, with respect to both the organization and the operation thereof, together with other objects and advantages may be best understood from the following description of specific embodiments when read in connection with the accompanying drawing, in which:

Figure 1:
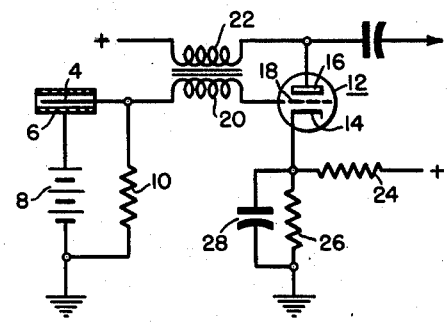
Figure 1 is a schematic showing of apparatus embodying my invention wherein a blocking oscillator is employed.

In accordance with my invention I provide a counter tube comprising a hollow chamber having walls 6 of conductive material and having therein a center electrode 4 likewise of conducting material. Connected between the walls 6 of the chamber and the central electrode 4 is a source of potential such as a battery 8 in series with a very large resistance 10. In the preferred embodiment of my invention, this large resistance 10 has a magnitude of the order of 1,000 megohms. The terminal of said battery 8 which is connected to said large resistance 10 being likewise connected directly to ground. A primary vacuum tube 12 is provided having therein a cathode 14, an anode 16 and a grid 18. The grid of the vacuum tube is connected to the center electrode 4 of the chamber so as to cause the vacuum tube 12 to be responsive to the potential on the center electrode 4 of the chamber. Connected to the vacuum tube 12 is apparatus which will operate in response to a small current through the vacuum tube and which when triggered by the counter tube electrode voltage due to the small current flowing through resistance 10, causing the current in tube 12 to build up rapidly to a large magnitude and then drop back rapidly to zero while causing that vacuum tube to draw grid current thereby neutralizing the charge on the center electrode. Such a circuit means can be a blocking oscillator as is incorporated in the embodiment of my invention shown in Fig. 1 or a triggered multivibrator as is employed in the embodiment of my invention shown in Fig. 2.

Referring first to the apparatus shown in Fig. 1 which incorporates the blocking oscillator circuit, the secondary winding 20 of a transformer is connected between the center electrode 4 of the chamber and the grid 18 of the primary vacuum tube 12. The primary winding 22 of the transformer is connected on one side to a positive source of D. C. potential and on the other side to the anode 16 of the vacuum tube 12. The cathode 14 of the vacuum tube is connected through a resistance 24 to the aforementioned positive source of potential and also is connected through a resistance 26 and capacitance 28, in parallel, to ground.

When radiation is incident on the chamber ionizations are caused therein which result in the production of a number of positive and negative charges inside of the chamber. The negative charges are attracted to the positive electrode and the positive charges or ions are attracted to the negative electrode. In the apparatus shown in Fig. 1, the center electrode 4 is negative and will therefore attract the positive ions. As these positive ions collect on the center electrode 4, that electrode becomes more positive. The positive charge on the center electrode 4 will tend to leak off through the large resistance 10 to the source of potential 8 connected to the chamber. However, the rate at which this charge will leak off is greatly restricted by the large magnitude of the resistance 10 connected thereto. Thus the ions collected on the center conductor cause a charge to build up over a substantial period of time, causing the center electrode of the ionization chamber to become more positive. Since the center electrode 4 of the chamber is connected to the grid 18 of the vacuum tube, the grid of the vacuum tube is caused to become more positive when the center electrode of the chamber becomes more positive. When the grid of the vacuum tube becomes sufficiently positive to overcome the cathode bias produced by the current flowing through the resistance 24 to ground, the vacuum tube will conduct and a plate current will flow from the positive source of potential through the primary winding 22 of the transformer, through the vacuum tube 12 and thence through the resistance 26 to ground. When this current begins to flow a change in flux occurs in the transformer which generates a potential in the secondary winding 20 of the transformer which is connected to the grid 18. These two windings 20, 22 are so oriented that when the plate current is increasing, such a potential will be established across the secondary winding of the transformer as causes the grid 18 to become more positive. As the grid 18 becomes more positive, the plate current further increases. I thus have a repeating cycle which causes the plate current to increase almost instantaneously until a saturation point is reached. When a saturation point is reached, the plate current drops off slightly. When the plate current drops off slightly, this causes an E. M. F. to be generated in the secondary winding 20 of the transformer in the reverse direction from that obtained when the plate current is increasing. Thus, as the plate current decreases, it causes the grid to become more negative. When the grid becomes more negative, the plate current is caused to decrease further. I thus have again a continuous cycle, but this time the cycle causes the current to rapidly decrease instead of increase. This decreasing cycle continues until the tube ceases to conduct.

While the vacuum tube 12 is conducting, grid current will be drawn which will cancel out the positive charge which was present on the center electrode 4 of the chamber when the vacuum tube started to conduct. Therefore, when the vacuum tube ceases to conduct, the center conductor of the chamber is sufficiently negative with respect to the cathode that when its potential again controls the potential of the grid of the vacuum tube, the vacum tube will not be caused to conduct. The apparatus will, therefore, remain static until radiation incident thereon has again built up a positive charge on the center electrode of the chamber of sufficient magnitude to cause the vacuum tube to conduct.

Figure 2:
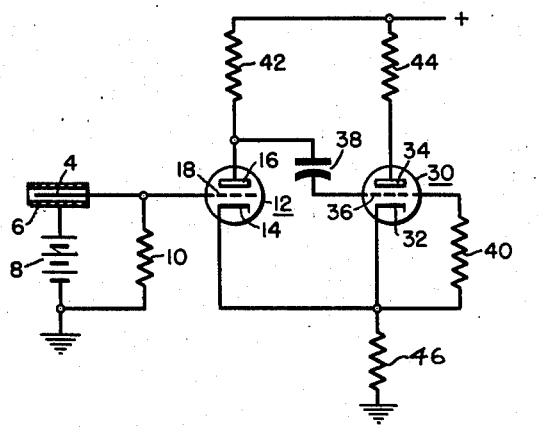
Fig. 2 is a schematic showing of apparatus embodying my invention wherein a triggered multivibrator circuit is employed.

The apparatus shown in Fig. 2 differs from that shown in Fig. 1 in that a triggered multivibrator is used as a discharge device in place of a blocking oscillator as was employed in the apparatus shown in Fig. 1.

In Fig. 2, in addition to the primary vacuum tube, the grid of which is connected to the center electrode of the chamber as pointed out in connection with the embodiment shown in Fig. 1, I employ a control vacuum tube 30. The control vacum tube contains a cathode 32, an anode 34 and a grid 36. The grid of the control vacuum tube 30 is connected through a condenser 38 to the plate 16 of the primary vacum tube 12 and through a resistance 40 to the filament 32 of the control vacum tube 30. A positive source of potential is connected through a resistance 42 to the anode of the primary vacuum tube 12 and through another resistance 44 to the anode 34 of the control vacuum tube 30. The cathode 14 of the primary vacuum tube 12 and the cathode 32 of the control vacuum tube 30 are connected together and are connected through a resistance 46 to ground.

When no radiation is incident on the ionization chamber, a current flows through the control vacuum tube 30 because the grid 36 of that tube being connected through a resistance 49 to the cathode 32 is at zero bias, causing tube 18 to be practically at cutoff. When sufficient positive charge is built up on the center electrode 4 of the chamber as a result of radiation incident thereon, the grid 18 of the primary vacuum tube 12 becomes sufficiently positive to cause it to conduct. When the primary vacuum tube conducts, the cathode 32 of the control vacuum tube 30 becomes more positive and the plate 16 of the primary vacuum tube 12 becomes more negative. As the plate 16 of the primary vacuum tube 12 becomes more negative, a pulse of electrons is sent through the condenser 38 to the grid 36 of the control vacuum tube 30. This pulse of electrons passing through the grid 36 of the control vacuum tube 30 causes the current through that vacuum tube to decrease. As the current through the control vacuum tube decreases the potential of the two cathodes 14, 32 becomes more nearly that of ground, or, in other words, more negative. As the two cathodes 14, 32 become more negative, the current through the primary vacuum tube 12 increases. As the current through the primary vacuum tube 12 increases, the plate 16 of the primary vacuum tube becomes even more negative which again causes a pulse of electrons to pass through the condenser 38 to grid 36 of the control vacuum tube 30. This cycle continues until saturation occurs in the primary vacuum tube, at which time the current through the control vacuum tube is very small.

When the saturation point of the primary vacuum tube is reached, the current through that tube begins to drop off slightly after a short period of time, and a series of oscillations between the primary vacuum tube and the control vacuum tube occur which are similar to those which occurred while the current was built up in the primary vacuum tube except that now they are working in the reverse direction. As the current through the primary vacuum tube decreases the plate becomes more positive, thereby causing the grid of the control vacuum tube to become more positive. As the grid of the control vacuum tube becomes more positive, the current through that tube increases. This in turn increases the potential of the cathode of the primary vacuum tube thereby decreasing the current through the primary vacuum tube. These cycles continue until a current ceases to flow through the primary vacuum tube.

While the primary vacuum tube is conducting, a grid current is present which cancels the positive charge which was on the grid and the center electrode 4 of the chamber at the time when the primary vacuum tube began to conduct. The apparatus is now ready to respond to radiation incident thereon in the same manner as before.

Although I have shown and described specific embodiments of my invention, I am aware that other modifications thereof are possible. My invention, therefore, is not to be restricted except insofar as is necessitated by the prior art and the spirit of the invention.

I claim as my invention:

1. In combination, an ionization chamber comprising a center conductor and a wall of conductive material surrounding said center conductor, a source of D. C. potential having a negative terminal connected to said center conductor and a positive terminal connected to said wall of conductive material, a positive feedback saturating oscillator circuit including an electron discharge device having anode, cathode and grid elements, a direct coupled connection between said grid element and said center conductor and means for supplying plate and bias voltages to the anode and cathode elements of said electron discharge device, whereby the flow of grid current in said saturating oscillator circuit is effective to remove stored charges from said center conductor.

2. In combination an ionization chamber comprising a central electrode and a wall of conductive material surrounding said center conductor, a source of D. C. potential connected between said center conductor and said conducting wall, a transformer having a primary winding and a secondary winding, a vacuum tube having therein a cathode, an anode and a grid, the primary winding of said transformer being connected between the center conductor of said chamber and the grid of said tube, the secondary winding of said transformer being connected between a terminal for applying a positive source of potential and the anode of said tube, the cathode of said tube being connected through a resistance to a terminal for supplying a positive source of potential and through another resistance to a terminal for applying a negative source of potential, circuit means attached to the anode of said tube, said circuit means being responsive to changes in the potential of said anode.

3. In combination an ionization chamber comprising a center conductor and a wall of conducting material surrounding said center conductor, a source of D. C. potential connected between said center conductor and said wall, a primary vacuum tube comprising a cathode, an anode and a grid, the grid of said primary vacuum tube being connected to the center conductor of said ionization chamber, a control vacuum tube comprising an anode, a cathode and a grid, the grid of said control vacuum tube being connected through a condenser to the anode of said primary vacuum tube and through a resistance to the cathode of said control vacuum tube, the anode of said primary vacuum tube being connected through a resistance to a terminal for supplying a positive potential and the anode of said control vacuum tube being connected through another resistance to said terminal for supplying a positive D. C. potential, the cathode of said control vacuum tube being connected through a resistance to a terminal for applying a negative potential.

References Cited in the file of this patent

UNITED STATES PATENTS

| Number | Name | Date |
|---|---|---|
| 2,383,478 | Friedman et al. | Aug. 28, 1945 |
| 2,416,201 | Nagel et al. | Feb. 18, 1947 |
| 2,418,892 | Lord, Jr. | Apr. 15, 1947 |
| 2,434,297 | Test et al. | Jan. 13, 1948 |
| 2,468,420 | Wendt | Apr. 26, 1949 |
| 2,500,788 | Bass | Mar. 14, 1950 |
| 2,503,730 | Hare | Apr. 11, 1950 |
| 2,609,512 | Conviser | Sept. 2, 1952 |

OTHER REFERENCES

Principles of Radar, M. T. I. Radar School Staff, 2nd edition, 1944. (Rec'd in Patent Office May 9, 1947.) Publ. by McGraw-Hill Book Co. Chapter 2, pages 82–88.

Theory and Operation of G-M Counters, Brown, Nucleonics, October 1948, page 48.